US007756720B2

(12) United States Patent
Fortuna, Jr. et al.

(10) Patent No.: US 7,756,720 B2
(45) Date of Patent: Jul. 13, 2010

(54) METHOD AND SYSTEM FOR THE OBJECTIVE QUANTIFICATION OF FAME

(75) Inventors: Joseph A. Fortuna, Jr., Lake Huntington, NY (US); George Kevin Fortuna, Cold Spring, NY (US)

(73) Assignee: Fameball, Inc., Cold Spring, NY (US)

( * ) Notice: Subject to any disclaimer, the term of this patent is extended or adjusted under 35 U.S.C. 154(b) by 544 days.

(21) Appl. No.: 11/698,014

(22) Filed: Jan. 25, 2007

(65) Prior Publication Data

US 2007/0192129 A1 Aug. 16, 2007

Related U.S. Application Data

(60) Provisional application No. 60/762,082, filed on Jan. 25, 2006.

(51) Int. Cl.
*G06F 17/60* (2006.01)

(52) U.S. Cl. ........................................................ 705/1.1

(58) Field of Classification Search .................. 705/1.1, 705/500

See application file for complete search history.

(56) References Cited

U.S. PATENT DOCUMENTS

| | | | | |
|---|---|---|---|---|
| 5,337,259 | A * | 8/1994 | Breed | 702/152 |
| 6,289,340 | B1 * | 9/2001 | Puram et al. | 707/5 |
| 7,454,393 | B2 * | 11/2008 | Horvitz et al. | 706/46 |
| 2003/0105642 | A1 * | 6/2003 | Andino et al. | 705/1 |
| 2005/0114399 | A1 * | 5/2005 | Hosoi | 707/104.1 |
| 2006/0212476 | A1 * | 9/2006 | Bogle et al. | 707/104.1 |

OTHER PUBLICATIONS

Forbes.com. "The Celebrity 100." Jun. 18, 2004. pp. 1-11 <http://www.forbes.com/2004/06/16/celebs04land.html>.*

* cited by examiner

*Primary Examiner*—John G Weiss
*Assistant Examiner*—Maame Ofori-Awuah
(74) *Attorney, Agent, or Firm*—Whiteford, Taylor & Preston LLP; Gregory M. Stone; Jeffrey C. Maynard

(57) ABSTRACT

A system and method for establishing fame-related weighted values associated with persons, places, or things through the automated analysis and collection of quantitative and contextual fame-related data, and for presenting such objective measurement to one or more users of such system.

17 Claims, 2 Drawing Sheets

METHOD AND SYSTEM FOR THE OBJECTIVE QUANTIFICATION OF FAME

CROSS REFERENCE TO RELATED APPLICATION

This application is based upon and claims benefit of U.S. Provisional Patent Application Ser. No. 60/762,082, filed with the U.S. Patent and Trademark Office on Jan. 25, 2006 by the inventor herein, the specification of which is incorporated herein by reference.

BACKGROUND OF THE INVENTION

1. Field of the Invention

This invention relates to a system and method for determining an objective measurement of fame, and more particularly to a system and method for establishing fame-related weighted values associated with persons, places, or things through the automated analysis and collection of quantitative and contextual fame-related data, and for presenting such objective measurement to one or more users of such system.

2. Background

Fame, i.e., the extent to which a person's celebrity status or notoriety makes them known to the public, carries commercial value. Interest has risen over more than the last decade to recognize and exploit such commercial value, with providers of goods and services seeking to exploit a person's fame by associating such person with their product or service, whether by way of seeking formal endorsement or simply (and at times in violation of such person's right of publicity) trading on their reputation through direct or implied association. Disputes have arisen over misappropriation of a famous person's identity for commercial advantage. Producers of new television programs and motion pictures often seek actors with greater celebrity status to increase the audience for their program or picture. Fans enjoy tracking the personal lives, new shows, and general information relating to their favorite celebrities, such as by watching and reading celebrity news, which itself has become a significant industry in the United States. In most instances, the greater a person's celebrity, the greater the commercial value that can be associated with such person's identity. However, a person's celebrity status is largely reduced to the power of the public relations machinery behind such person. A person's celebrity status is typically only as powerful and/or valuable as their ability to remain in the news. Unfortunately to date, no objective measurement exists that can quantify fame and give a market-satisfiable analysis of the public standing of a celebrity.

SUMMARY OF THE INVENTION

It would be advantageous to create an objective measurement of fame that can be used to formulate projections and market analysis pertaining to celebrities, which data would be useful to fans who simply enjoy tracking success of their favorite celebrities, and to those who seek to exploit the commercial value of particular celebrities. Quantification of this type can also be used as the basis of a content paradigm for an entertainment website, creating a hierarchy of celebrities.

Disclosed is a collection of computer programs that uses the vast amount of interconnected data available on the Internet to generate an objective measurement of celebrity. This information typically takes the form of public news feeds being released by traditional news media outlets, public relations firms, and private citizens. Much of this information is published in RSS (Really Simple Syndication) format, an open standard on the Internet, which is rapidly becoming the default protocol for news syndication. RSS is a family of web feed formats used to publish frequently updated pages, such as blogs or news feeds. Creating weighted vectors of information culled from public relations feeds, entertainment news feeds, private sources of information (fan sites, personal web logs, web logs of celebrities themselves, etc.), media sales data, meta information culled from sources generating informal analysis (i.e., frequency of search terms), and hard news feeds, the system uses these vectors to generate a matrix of weighted values for each celebrity. The weighted rankings associated with each celebrity are also informed by a mechanism for soliciting and processing user feedback that is both quantitative (vote counts, ratings, etc.) and contextual (textual analysis of free text comments). Each matrix of information is used to represent an objective value of an aspect of that celebrity's fame. News and information used for the above analysis is also cached, and a database of ever-increasing size is maintained. Information in the database is used to generate an historical measure of each celebrity's fame and to perform additional calculations based on the frequency and character of mention of each celebrity in the context of every other celebrity.

Statistical and demographic information is also maintained, which allows the system to categorize celebrities and present a domain-specific measurement of fame for each celebrity (most famous country singer, most famous female sports figure, etc.).

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF EXEMPLARY EMBODIMENTS

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In a particularly preferred embodiment of the invention, the system (and the method employed by such system) divides its functions into three major functional components: Database Generation, Quantification, and Presentation. Subject to the nature of the request made by a user, each process can be asynchronous to every other, or several processes can follow on one another as dependencies. Each case is described below. In addition, while the system and method are described herein by way of quantifying fame associated with an individual, such is by way of example only, and those of ordinary skill in the art will readily recognize that such system and method are likewise applicable to quantifying the fame, notoriety, or like attribute of other persons, places, or things.

Database Generation

Figure 1:
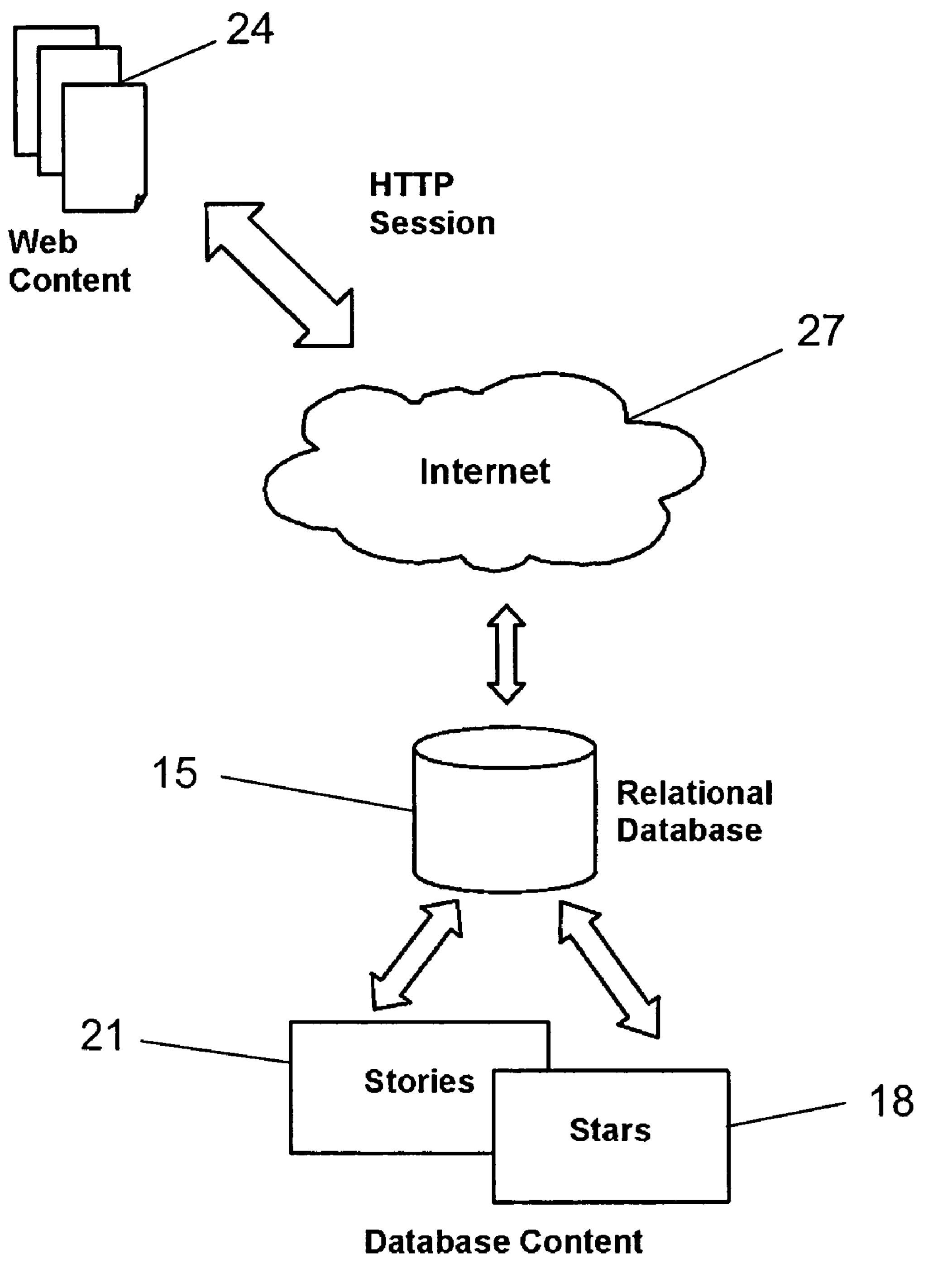
FIG. 1 is a block diagram showing database generation according to a first embodiment of the present invention.

As shown in FIG. 1, the system uses a relational database structure for organization of collected data. The major tables of information in the relational database 15 are preferably: Stories, Stars, FameTypes (categories of celebrity), StarTypes (many to many mapping between Stars and FameTypes), and StarStories (a many to many mapping between Stars and Stories). The Stars table 18 preferably contains personal data specific to each celebrity (name, gender, age, etc.). The Stories table 21 preferably contains celebrity-related news and information gathered by a Data Generation process, described in more detail below. Stories are formatted to preferably include date, story title, story source, story abstract, and story text. Additional fields preferably include story-specific photo file, duration of chat (if information is harvested by a chat bot, as described below), and reply count (if information is harvested from a message board).

The StarStories table may include fields for both StoryId and StarId, as well as fields that indicate whether a given story is considered a "Strong Match" for a given star. A strong match is determined by a combination of frequency of mention of the celebrity, whether the celebrity is listed (included in a comma-delimited list of other celebrities) or referred to explicitly, and the occurrence of the celebrity's name in any available title.

Within the text of a story, celebrity names are tagged, in standard XML format as <PERSON>. Names may be identified in a number of ways. In several formats (particularly those harvested from deep links identified in RSS feeds provided by formal news outlets) celebrity names may be encased in very easily identifiable blocks of JavaScript, or clearly labeled DOM elements (e.g., classnames for <div>elements). Using this method, and through hand editing and accumulation, the system relies on a celebrity database—a list of names known to be celebrities. This list is amended on an ongoing basis, both by the application and by the application's engineers.

In the absence of both specific HTML indicators and recognition of a learned name, names are extracted by regular expression pattern matching. Specifically, matching against the following pattern: "\\s([A-Z][a-z]+[A-Z][a-z][a-zA-Z][a-z]+([A-Z][a-z]+)?" A further refinement to pattern matching includes verb parsing based on syntactically correct placement of a known list of verbs in and around the matched pattern. Verbs are parsed according to conjugated forms as well as lexical stems.

Finally, domain-specific terminology is used to identify celebrity names within a document. Words, such as "diva," "heartthrob," "legend," etc., exist in the database in a separate table and are used to locate sentences within which there is a high likelihood of the presence of a celebrity name.

All of these methods are used in concert—along with hand editing of the results.

Celebrity-related information (the content, or data within which the aforementioned references to celebrities are found) is drawn from a number of sources available as raw web content 24. Most useful are hard news sources from formal outlets, such as AP, Reuters, E! Online, etc. This data is publicly available over the Internet 27 as RSS feeds. Within each feed, on a per-story basis, date, title, and abstract information are specifically tagged, as is a link to a deeper story available on the Internet 27. The system parses these tags, storing the relevant information in the database. Then, using an HTTP GET request, the invention siphons the deeper story, scrubs any extraneous advertising and HTML information, tags the celebrity names, as described above, and stores the deeper content along with the date, title, and abstract in the relational database 15.

Other web content 24 that is available in similar RSS format includes celebrity blogs (web logs maintained by the celebrities themselves), fan blogs (web logs maintained by a celebrity fan base), and general blogs (web logs maintained by otherwise disinterested parties—which may include information about a given celebrity). A list of these feeds is maintained by the system, based on the results of automated web searches, and a WebCrawler designed to pursue related links throughout the Internet 27.

The application also harvests data from a cached list of message boards and public sites that contain posts of celebrity-related opinions and news. The list of sites is automatically generated and maintained by the application—created by crawling the web looking for such sites—and is hand-edited by human beings. Information from these sites is generally formatted in such a way as to make the division into date, title, and story text a fairly simple process of parsing the HTML. Celebrity names are identified in the manner described above.

The application also releases a collection of IRC chat "robots" that are designed to "lurk" in public chat rooms known to be dedicated to the discussion of celebrities. The robots collect and store chat data as well as information about duration of chats, population of chat rooms, and geographic location of chat servers. The data accumulated by the 'bots is often unstructured and written in characteristic "chat shorthand." Therefore, the application includes a separate parsing engine for identifying celebrity references, cataloging them, and attaching a weight to each reference.

Finally, celebrity data is often released by each celebrity's own public relations firm. Organizations exist (e.g., PR Newswire) that make this information available on a per-story basis in RSS format.

All RSS feeds are preferably acquired using HTTP GET commands, scheduled and automatically launched by the system. As mentioned above, any follow-up requests for deeper content referred to in the feeds are also preferably made via HTTP GET commands. Once acquired, all data is then sifted, scrubbed, tagged, and stored as described above.

Figure 2:
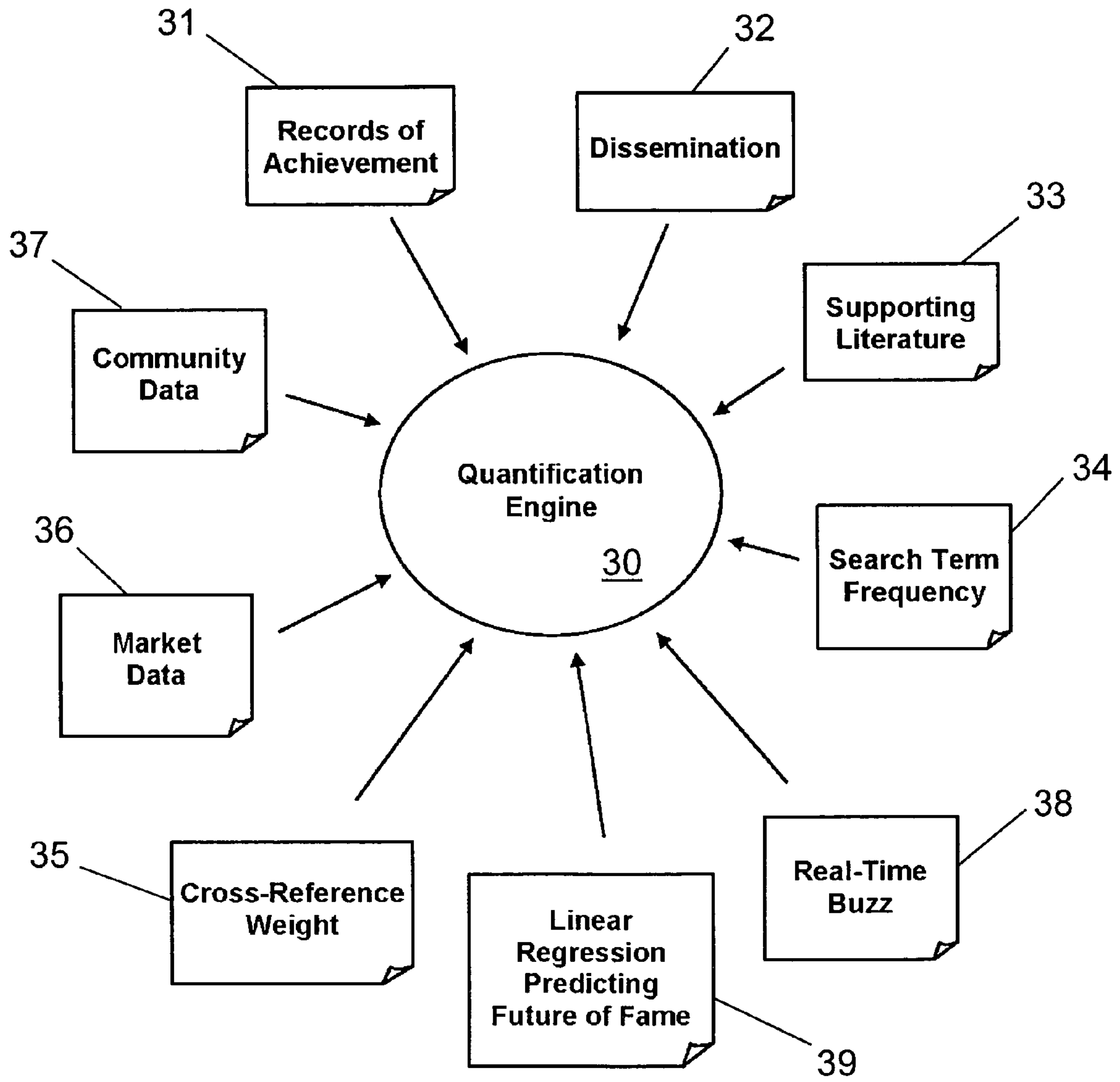
FIG. 2 is a block diagram illustrating inputs to a quantification engine according to a first embodiment of the present invention.

Quantification Referring to FIG. 2, the application creates a nine-dimensional vector associated with each celebrity, based on information culled from the database described above, as well as additional data generated by users of the system and accumulated by the system's crawling engine. Each dimension of the vector provides input to a quantification engine 30 according to the present invention. The dimensions of the vector are preferably: records of achievement 31, dissemination 32, supporting literature 33, search term frequency 34, cross-reference weight 35, market data 36, community data 37, real-time buzz 38, and prediction of future fame 39. Other dimensions can be used.

Records of Achievement

In a preferred embodiment, the application checks within its own database for references to records of achievement made by the celebrity in question. These are domain-specific achievement categories and identified by the FameType associated with each celebrity (see above). Examples include Oscar nominations, Emmy nominations, Grammy nominations, and any award received by the celebrity. In addition to its own database of information, the application checks against a cached list of associated sites for further corroboration of achievement data. The cached list of sites is automatically maintained and generated by the application crawler, and is also hand-edited. Since all such achievements are regularly scheduled events, the application is programmed to acquire the appropriate material on a scheduled basis.

Based on information accumulated from the above analysis, a weight for the Record of Achievement dimension 31 is assigned to the celebrity vector.

Dissemination This is a measure of the degree to which a given story associated with a celebrity has been "picked up" by news outlets other than the first examined. To determine this, each story in the application's database is measured against each other story and assigned a similarity value. The equation for determining similarity is a standard cosine equation based on TF/IDF weights assigned to bigrams within each story.

First a corpus of data is formed by the concatenation of all story text associated with the celebrity. This concatenated corpus is then stripped of all words occurring in a pre-compiled stoplist (incidental words found by humans not to have relational impact on the contextual information). Then, bigrams are generated for the entire corpus of data.

Each of the bigrams is then passed through a term frequency/inverse document frequency (TF/IDF) analysis that assigns a weight to each bigram, based on the non-concatenated corpora represented by all stories. The equation for weight assignation is standard:

$$W_{i,j}=tf_{i,j}*\log(N/n_i)$$

That is, the weight of a bigram within a given story is equal to the frequency of occurrence of that term within the story multiplied by the log of the total number of stories divided by the frequency of the bigram within all stories (calculated above).

Having calculated the TF/IDF weight of each bigram in each story, the similarity between the two stories is then established by taking the dot product of the two resulting vectors:

$$sim(d_k, d_j) = \sum_{i=1}^{N} w_{i,k} * w_{i,j}$$

Documents with a high degree of similarity between themselves and other documents from other sources are assumed to be stories that have been widely disseminated. This is an indication of a fertile story—and contributes to the fame of a given celebrity.

Based on information accumulated from the dissemination analysis, a weight for the Dissemination dimension 32 is assigned to the celebrity vector.

Supporting Literature

For a very select group of celebrities (Benjamin Franklin, Allah, Gandhi, etc.) the real-time data generated on a regular basis may be exceedingly sparse. However, for this variety of celebrity, it is generally found that the celebrity's name has ascended to placement within the lexicon. The application therefore makes a special check against sites that provide lexicographical information (online dictionaries, encyclopedias, etc). A cached list of these sites is automatically maintained by the application's crawler and is hand-edited.

Based on such lexicographical information, a weight for the Supporting Literature dimension 33, if appropriate, is assigned to the celebrity vector.

Search Term Frequency

This dimension can have an internal portion and an external portion. Several existing web search engines (e.g. Yahoo!) provide an analysis of the most frequently searched words and phrases. Often, celebrity names appear in this list. The application therefore checks against these sites for each celebrity's placement and assigns a weight to the Search Term Frequency dimension 34 of the celebrity's vector. Furthermore, based on internal user searches of the system described herein, the application can modify the Search Term Frequency dimension 34 due to discrete searches for particular celebrities within the database.

Cross-Reference Weight

This is a measurement of the frequency of occurrence of a given celebrity's name in stories associated with other celebrities. A similarity check is first made for each occurrence, as described above. If two stories are found to be too similar, there is a danger that they may essentially be the same story repeated (or "picked up"). Such references are discounted. Any additional reference adds to the Cross-Reference Weight dimension 35 of a given celebrity. The application analyses its own database of information for such references.

Market Data Sports and Entertainment celebrities are widely recognized for the salaries they command—and both athletes and actors are prized for the ticket sales their presence is seen to generate. All of this information is publicly available. The application keeps a cached list of sites that is automatically generated by its crawler, and hand-edited, that provide such information. The application also maintains a schedule of events (film releases, sporting events, etc.) and performs a periodic check of the performance of such events, using previously generated data (see above and below) to identify the associated celebrities and credit them with a weight for the Market Data dimension 36 of their vector. Other information included in the Market Data dimension 36 may include the value of endorsement deals, product placement, alternative or cross-market endeavors, such as athletes appearing in movies or on talk shows, and the like.

Community Data

The application is designed to generate a member base and to encourage and facilitate input from that membership. Input can be both quantitative, in the form of explicit rankings for each celebrity, ("How famous do you think Wayne Gretsky is?" or "Who is your favorite athlete?") and qualitative, in the form of user-posted comments relating to celebrities or events with which celebrities are associated.

Based on information accumulated member base input, a weight for the Community Data dimension 37 is assigned to the celebrity vector.

Real-Time Buzz

This dimension measures the timeliness of information about a celebrity. Stories that are more recent are given a greater weight than old stories. Input to the Real-Time Buzz dimension 38 may include notoriety, such as police arrests or civil suits, as well as personal announcements or press releases.

Prediction of Future Fame

Once significant records exist detailing the past output of the quantification engine, it will be possible to assign a numerical value predicting the future performance of a given star by regressing against existing data. The technique involves creating a simple linear equation from the set of values of each dimension vector, and summing towards a minimum squared error. The minimum squared error would be the lowest possible value for the sum of differences between true—training—values (here the past record of celebrity performance) and the output of a linear equation. To minimize the squared error, one can begin by attaching random values for the coefficients of the summation, and then minimize the gradient of the squared error to find the optimal value for θ (the vector of coefficients). Minimization, in the case of ordinary linear regression, can be achieved by taking partials to obtain the gradient, or by using gradient descent and back-propagated neural networks with sinusoidal functions at the activation layers. Such techniques are well documented and have proven effective at producing reasonably accurate predictive conclusions from sufficient data. Using such linear regression techniques, a value for the Prediction of Future Fame dimension 39 is assigned to the celebrity vector.

Normalization

Finally, having identified all of the value weights for the dimensions for each celebrity vector, the vector dimensions are then normalized using the square-root of the sum of the squares of the values:

$$u=\sqrt{v^2}=\sqrt{v_1^2+v_2^2+v_3^2+v_4^2+v_5^2+v_6^2+v_7^2+v_8^2+v_9^2}$$

This assigns an objective fame weight U to each celebrity.

Presentation

Given all of the mechanisms mentioned above, and the existence of an underlying relational database, the final presentation of the data can take many forms. In general, the data may be available to a user who accesses a particular website on the Internet. For example, celebrities may be ranked in descending order of the fame weight assigned in the manner described above. The data may be presented as a series of HTML pages, and rankings may be generated on a daily, weekly, and/or monthly basis. In addition, an "all-time" rank may be given for each celebrity. Such information may be textual, graphic, or combinations of textual and graphic displays.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A computer implemented method of quantifying measurement of fame of a celebrity, comprising the steps of:

providing a relational database for holding information about a plurality of celebrities, said information being arranged in a plurality of tables in the database, said tables comprising:

stories;

wherein such information in the stories table contains celebrity related news and information gathered by a data generation process and such information is selected from the group consisting of:

date of story;

story title;

story source; and story text;

identification of celebrities;

wherein such information in the identification of celebrities table contains data selected from the group consisting of:

name;

gender; and age;

categories of celebrity;

many to many mapping between the identification of celebrities to the categories of celebrity;

many to many mapping between the identification of celebrities to the stories;

providing a quantification engine having software for use in a computer processor adapted to execute said software;

using said computer process to parse each story in the stories table and perform bigram analysis of the text of each said story to determine frequency of each term in the story;

using said computer processor to create creating a multidimensional vector representing quantifiable measures of fame for each of said plurality of celebrities, wherein a value for each dimension of said vector provides input to said quantification engine;

using said computer processor to normalize the value of the dimensions for each of said plurality of celebrities; and using said quantification engine to compute an objective fame weight based on said normalized value.

2. The method of claim 1, further comprises the steps of:

presenting said information for viewing by a user, wherein each celebrity is listed in order of fame weight.

3. The method of claim 1, wherein the step of creating a multidimensional vector further comprises the steps of:

using said computer processor to establish a record of achievement dimension for each of said plurality of celebrities, wherein said record of achievement dimension comprises a weighted value for domain specific achievement categories.

4. The method of claim 3, wherein said domain specific achievement categories are identified by associating the category of celebrity with each of said plurality of celebrities.

5. The method of claim 1, wherein the step of creating a multidimensional vector further comprises the steps of:

using said computer processor to establish a dissemination dimension for each of said plurality of celebrities, wherein said dissemination dimension comprises a weighted value for similarity between two or more related stories concerning said celebrity.

6. The method of claim 5, wherein the weight of a bigram within a given story is equal to the frequency of occurrence of that term within that story multiplied by the log of the total number of stories divided by the frequency of the bigram within all stories, and said similarity is determined by calculating the dot product of the vectors of two stories being compared.

7. The method of claim 1, wherein the step of creating a multidimensional vector further comprises the steps of:

using said computer processor to establish a supporting literature dimension for each of said plurality of celebrities, wherein said supporting literature dimension comprises a weighted value based on lexicographical information concerning said celebrity.

8. The method of claim 7, wherein if lexicographical information concerning said celebrity is present, a predetermined weight is added to the objective fame weight of the celebrity.

9. The method of claim 1, wherein the step of creating a multidimensional vector further comprises the steps of:

using said computer processor to establish a search term frequency dimension for each of said plurality of celebrities, wherein said search term frequency dimension comprises a weighted value based on placement of said celebrity's name on a list of frequently searched words and phrases.

10. The method of claim 1, wherein the step of creating a multidimensional vector further comprises the steps of:

using said computer processor to establish a cross-reference weight dimension for each of said plurality of celebrities, wherein said cross-reference weight dimension comprises a weighted value based on association of said celebrity with at least one other celebrity.

11. The method of claim 10, wherein the weight of a bigram within a given story is equal to the frequency of occurrence of that term within that story multiplied by the log of the total number of stories divided by the frequency of the bigram within all stories, and similarity of stories is determined by calculating the dot product of the vectors of two stories being compared wherein, if two stories are found to be too similar, such references are discounted, otherwise, any additional reference adds to the cross-reference weight dimension of a given celebrity.

12. The method of claim 1, wherein the step of creating a multidimensional vector further comprises the steps of:

using said computer processor to establish a market data dimension for each of said plurality of celebrities, wherein said market data dimension comprises a weighted value based on said celebrity's salary, endorsements, ticket sales, and the like.

13. The method of claim 1, wherein the step of creating a multidimensional vector further comprises the steps of:

using said computer processor to establish a community data dimension for each of said plurality of celebrities, wherein said community data dimension comprises a weighted value based on user input.

14. The method of claim 1, wherein the step of creating a multidimensional vector further comprises the steps of:

using said computer processor to establish a real-time buzz dimension for each of said plurality of celebrities, wherein said real-time buzz dimension comprises a weighted value based on timelines of information about said celebrity.

15. The method of claim 1, wherein the step of creating a multidimensional vector further comprises the steps of:

using said computer processor to establish a prediction of future fame dimension for each of said plurality of celebrities, wherein said prediction of future fame dimension comprises a weighted value based on linear regression analysis of a plurality of fame indicators.

16. The method of claim 1, wherein said step of normalizing further comprises the steps of:

using said computer processor to determine the square-root of the sum of the squares of the values of each said dimension.

17. The method of claim 1, further comprising:

using said computer processor to calculate score ranking on a daily, weekly, and/or monthly basis.

* * * * *